(12) United States Patent
Bargeron et al.

(10) Patent No.: US 7,568,151 B2
(45) Date of Patent: Jul. 28, 2009

(54) NOTIFICATION OF ACTIVITY AROUND DOCUMENTS

(75) Inventors: David M. Bargeron, Seattle, WA (US); Alice Jane Bernheim Brush, Seattle, WA (US); Anoop Gupta, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 611 days.

(21) Appl. No.: 10/186,233

(22) Filed: Jun. 27, 2002

(65) Prior Publication Data

US 2004/0003352 A1    Jan. 1, 2004

(51) Int. Cl.
    *G06F 17/30* (2006.01)
(52) U.S. Cl. .................... 715/231; 715/230
(58) Field of Classification Search ............ 715/512, 715/511, 514, 527, 530, 200, 230, 231, 255, 715/274
    See application file for complete search history.

(56) References Cited

U.S. PATENT DOCUMENTS

| | | | |
|---|---|---|---|
| 5,333,266 A | 7/1994 | Boaz et al. | |
| 5,524,193 A | 6/1996 | Covington et al. | |
| 5,526,407 A | 6/1996 | Russell et al. | |
| 5,572,643 A | 11/1996 | Judson | |
| 5,583,980 A | 12/1996 | Anderson | |
| 5,600,775 A | 2/1997 | King et al. | |
| 5,633,916 A | 5/1997 | Goldhagen et al. | |
| 5,699,089 A | 12/1997 | Murray | |
| 5,732,216 A | 3/1998 | Logan et al. | |
| 5,796,393 A * | 8/1998 | MacNaughton et al. | 715/733 |
| 5,802,510 A * | 9/1998 | Jones | 707/2 |
| 5,809,250 A | 9/1998 | Kisor | |
| 5,826,039 A * | 10/1998 | Jones | 709/206 |
| 5,832,221 A * | 11/1998 | Jones | 709/206 |
| 5,838,313 A | 11/1998 | Hou et al. | |
| 5,893,087 A | 4/1999 | Wlaschin et al. | |
| 5,893,110 A | 4/1999 | Weber et al. | |
| 5,903,892 A | 5/1999 | Hoffert et al. | |
| 5,923,848 A | 7/1999 | Goodhand et al. | |
| 5,969,716 A | 10/1999 | Davis et al. | |
| 5,991,365 A | 11/1999 | Pizano et al. | |
| 6,009,462 A | 12/1999 | Birrell et al. | |
| 6,020,884 A * | 2/2000 | MacNaughton et al. | 715/747 |

(Continued)

FOREIGN PATENT DOCUMENTS

EP          0 650 126          4/1995

(Continued)

OTHER PUBLICATIONS

"Beyond browsing: shared comments, SOAPS,trials, and on-line communities", Roscheisen et al., Computer Networks and ISDN Systems 27 (1995), pp. 739-749.

"Marquee: A Tool for Real-Time Video Logging", Weber et al., Proceedings of CHI '94, Boston, MA, Apr. 1994, ACM Press, pp. 58-64.

(Continued)

*Primary Examiner*—Stephen S Hong
*Assistant Examiner*—Gregory J Vaughn
(74) *Attorney, Agent, or Firm*—Perkins Coie LLP (57) ABSTRACT

Users are able to subscribe to notifications regarding activity around particular documents (e.g., changes to and/or annotations to the documents). A variety of different notification parameters can be set by the user, allowing him or her to request the type(s) of notifications he or she would like to receive, as well as how frequently notifications are to be received.

12 Claims, 7 Drawing Sheets

U.S. PATENT DOCUMENTS

| | | | |
|---|---|---|---|
| 6,029,175 A * | 2/2000 | Chow et al. ............... | 707/104.1 |
| 6,081,829 A | 6/2000 | Sidana | |
| 6,085,185 A | 7/2000 | Matsuzawa et al. | |
| 6,105,055 A | 8/2000 | Pizano et al. | |
| 6,144,375 A | 11/2000 | Jain et al. | |
| 6,173,287 B1 | 1/2001 | Eberman et al. | |
| 6,173,317 B1 | 1/2001 | Chaddha et al. | |
| 6,230,172 B1 | 5/2001 | Purnaveja et al. | |
| 6,311,189 B1 | 10/2001 | DeVries et al. | |
| 6,317,141 B1 | 11/2001 | Pavley et al. | |
| 6,332,144 B1 | 12/2001 | DeVries et al. | |
| 6,360,234 B2 | 3/2002 | Jain et al. | |
| 6,366,296 B1 | 4/2002 | Boreczky et al. | |
| 6,433,795 B1 * | 8/2002 | MacNaughton et al. ..... | 715/738 |
| 6,438,566 B1 | 8/2002 | Okuno et al. | |
| 6,449,653 B2 | 9/2002 | Klemets et al. | |
| 2001/0042098 A1 | 11/2001 | Gupta et al. | |
| 2002/0087053 A1 * | 7/2002 | Stoycos et al. ............... | 600/300 |
| 2002/0087092 A1 * | 7/2002 | Stoycos et al. ............... | 600/523 |
| 2002/0169835 A1 * | 11/2002 | Paul et al. .................... | 709/206 |
| 2003/0059003 A1 * | 3/2003 | Lewis ....................... | 379/88.13 |
| 2003/0163525 A1 * | 8/2003 | Hendriks et al. ............ | 709/204 |
| 2004/0054630 A1 * | 3/2004 | Ginter et al. .................. | 705/53 |
| 2004/0186817 A1 * | 9/2004 | Thames et al. ................. | 707/1 |

FOREIGN PATENT DOCUMENTS

| | | |
|---|---|---|
| GB | 2 301 260 | 11/1996 |
| WO | WO 97/49251 | 12/1997 |

OTHER PUBLICATIONS

"MediaWeaver- A Distributed Media Authoring System for Networked Scholarly Workspaces", Sha Xin Wei, Multimedia Tools and Applications 6, 1998, Kluwer Academic Publishers, pp. 97-111.
"What should a Wildebeest say? Interactive Nature Films for High School Classrooms", Smith et al., ACM Multimedia 97- Electronic Proceedings, Nov. 8-14, 1997, pp. 193-201.
"Pan-Browser Support for Annotations and Other Meta-Information on the World Wide Web", Schickler et al., Fifth International World Wide Web Conference, May 6-10, 1996, Paris, France, 14 pages.
"Shared Web Annotations as a Platform for Third-Party Value-added Information Providers: Architecture, Protocols, and Usage Examples", Roscheisen et al., Technical Report CSDTR/DLTR, 33 pages.
"Distributed Collaborative Writing: A Comparison of Spoken and Written Modalities for Reviewing and Revising Documents", Neuwirth et al., Proceedings of the CHI '94, Boston, Massachusetts, Apr. 24-28, 1994, pp. 51-57.
"Mulitvalent Annotations", Phelps et al., Proceedings of the First European Conference on Research and Advanced Technology for Digital Libraries, Sep. 1-3, 1997, Pisa, Italy, 15 pages.
"Toward an ecology of hypertext annotation", Marshall, C., Proceedings of the HyperText '93, ACM press, Jun. 1998, pp. 40-48.
"The Knowledge Weasel Hypermedia Annotation System", Lawton et al., Hypertext '93 Proceedings, Nov. 1993, pp. 106-117.
"A Protocol for Scalable Group and Public Annotations", LaLiberte et al., 1997 NCA Technical Proposal, available at http://union.ncsa. uiuc.edu/-liberte/www/scalable-annotations.html, 10 pages.
"VIRON: An Annotation-Based Video Information Retrieval System", Kim et al., Proceedings of COMPSAC '96, IEEE 1996, pp. 298-303.
"Relativity Controller Reflecting User Perspective in Document Spaces", Gould, E., Adjunct Proceedings of INTERCHI '93, 1993, ACM Press, pp. 125-126.
"Open Architecture Multimedia Documents", Gaines et al., Proceedings of the Multimedia '93, Aug. 1993, ACM Press, pp. 137-146.
"Expressive Richness: A Comparison of Speech and Text as Media For Revision", Chalfonte et al., Proceedings of the CHI '91, ACM 1991, pp. 21-26.
"An Annotation Engine for Supporting Video Database Population", Carrer et al., Multimedia Tools and Applications 5, 1997, Kluwer Academic Publishers, pp. 233-258.
"Diane: A Multimedia Annotation System", Bessler et al., Proceedings of the ECMAST '97, Milan, Italy, May 1997, 16 pages.
"Teaching and Learning as Multimedia Authoring: The classroom 2000 project", Abowd et al., Proceedings of the Multimedia '96, Boston, MA, Nov. 1996, ACM Press, pp. 187-198.
"CoNote System Overview", Davis et al. 1995, available at: http://www.cs.cornell.edu/home/dph/annotation/annotations.html, 3 pages.
"Mastering Microsoft Office 97", 2nd Ed., Moseley, L., Boodey, D., Sybex Inc., 1997, pp. 812-816, and 756-763.
"Integrated multimedia messaging concepts and applications", Pizano et al., Proceedings of the 1996 ACM symposium on Applied Computing, pp. 12-16.
"Synchronized Multimedia integration Language (SMIL) 1.0 Specification", W3C Recommendation, Jun. 15, 1998, website: http://www.w3.org/TR/REC-smil/, 40 pages.
"Microsoft and RealNetworks Wage Media War", Booker, E., TechWeb, The Business Technology Network, Jul. 10, 1998, 2 pages.
"RealNetworks unveils software line for multimedia displays", Nerney, C., NetworkWorldFusion, May 4, 1998, 2 pages.
"DynaText: An Electronic Publishing System", Smith, M., Computers and the Humanities, vol. 27, Nos. 5-6, 1993-1994, pp. 415-420.
"Storage and Retrieval for Image and Video Databases", Niblack, W., Proceedings SPIE- The International Society for Optical Engineering, vol. 1908, Feb. 2-3, 1993, pp. 25-36.
"Annotations for Streaming Video on the Web: System Design and Usage Studies", Bargeron et al., Proc. WWW8, Elsevier, 1999, 11 pages.
"Asynchronous Collaboration Around Multimedia and Its Application to On-Demand Training", Bargeron et al., Proceedings of the 34th Hawaii International Conference on System Sciences, IEEE, 2001, pp. 1-10.
"Using Web Annotations for Asynchronous Collaboration Around Documents", Cadiz et al., Proc. CSCW, ACM Press, 2000, 10 pages.
"What Groupware Functionality Do Users Really Use? Analysis of the Usage of the BSCW System", Appelt, W., Proc. 9th Euromicro Workshop on PDP, pp. 1-5.
"WWW Based Collaboration with the BSCW System", Appelt, W., Proc. SOFSEM '99, Springer Lecture Notes in Computer Science 1725, pp. 66-78.
"The User-centered Iterative Design Of Collaborative Writing Software", Baecker et al., Proc. INTERCHI '93, Apr. 1993, pp. 399-405.
"Sideshow: Providing Peripheral Awareness of Important Information", Cadiz et al., Microsoft Technical Report 2001-83, Sep. 2001, 9 pages.
"Awareness and Coordination in Shared Work Spaces", Dourish et al., Technical Report EPC-92-101, Published in Proceedings ACM Conference on Computer-Supported Cooperative Work, Nov. 1992, pp. 1-9.
"AREA: A Cross-Application Notification Service for Groupware", Fuchs, L., Proceedings of the Sixth European Conference on Computer-Supported Cooperative Work, Sep. 1999, pp. 61-80.
"A Usability Study of Awareness Widgets in a Shared Workspace Groupware System", Gutwin et al., Proc. CSCW, 1996, pp. 258-267.
"Beyond Web Technology- Lessons Learnt from BSCW", Koch et al., Proc. 1998 IEEE WEI ICE Workshop, 9 pages.
"Collaborative Document Production Using Quilt", Leland et al., Proc. CSCW, 1988, pp. 206-215.
"Issues in the Design of Computer Support for Co-authoring and Commenting", Neuwirth et al., Proc. CSCW 90, Oct. 1990, pp. 183-195.
"Annotation technology", Ovsiannikov et al., Int. J. Human-Computer Studies 50, 1999, pp. 329-362.
"Shared Web Annotations As A Platform for Third-Party Value-Added Information Providers; Architecture, Protocols, and Usage Examples", Roscheisin et al., Technical Report CSDTR/DLTR, 1997, 33 pages.
"Word 2000: The Microsoft Office Word Processor", May 31, 2001, 9 pages.
"Executive Brief: Functional Assessment of Open Text Livelink", Turocy et al.,Doculabs MarketFocus Report, 2000, pp. 1-11.
"Intraspect tool simplifies collaboration", Network World Fusion, website: http://www.nwfusion.com/news/2002/132625_05-20-2002.html, May 20, 2002, 2 pages.

* cited by examiner

NOTIFICATION OF ACTIVITY AROUND DOCUMENTS

TECHNICAL FIELD

This invention relates to digital content, and particularly to notification of activity around documents.

BACKGROUND

A wide variety of content is currently available in digital form, such as articles, papers, other publications, images, video, audio, combinations thereof, etc. As digital content has become increasingly popular, mechanisms have been developed to allow actions normally associated with content in more traditional forms (e.g., paper) to be performed on digital content. An example of such is the annotation of content. A reader of a traditional paper-copy of an article is able to use a pen or pencil to jot down notes in the margins, underline or circle sections of the article, use a highlighter to highlight portions of the article, etc. Systems are being developed that allow such actions to be performed on digital forms of content as well.

Annotating of digital content can provide numerous benefits, such as allowing multiple individuals to view (or hear) and annotate the content concurrently. However, one problem faced with annotating such digital content is how users are made aware of the annotations. One solution is to require the user to re-view the content in order to view the annotations, however this is burdensome on the part of the user. Another solution is for the annotation author to send an electronic mail (email) message to a certain user(s) whenever he or she adds a new annotation to the document. However, this is also burdensome on the user as it requires the annotation author to identify the user(s) to receive the electronic mail messages, and can result in numerous electronic mail messages being sent to the user. Thus, improvements are needed in how users are made aware of annotations.

Digital content also allows certain actions to be taken that cannot be easily taken with non-digital content. For example, content can be more easily edited by multiple persons, and can even be edited by multiple persons concurrently. However, as with annotating content, there is a problem faced in how users are notified of changes to the content.

Notification of activity around documents described herein helps solve these and other problems.

SUMMARY

Notification of activity around documents is described herein.

Users are able to subscribe to notifications regarding activity around a document(s). Different embodiments allow different ones of multiple notification parameters to be set by the user.

BRIEF DESCRIPTION OF THE DRAWINGS

The same numbers are used throughout the document to reference like components and/or features.

DETAILED DESCRIPTION

Notification of activity around documents is described herein. Users are able to subscribe to notifications regarding activity around particular documents (e.g., changes to and/or annotations to the documents). A variety of different notification parameters can be set by the user, allowing him or her to request the type(s) of notifications he or she would like to receive, as well as how frequently notifications are to be received.

Figure 1:
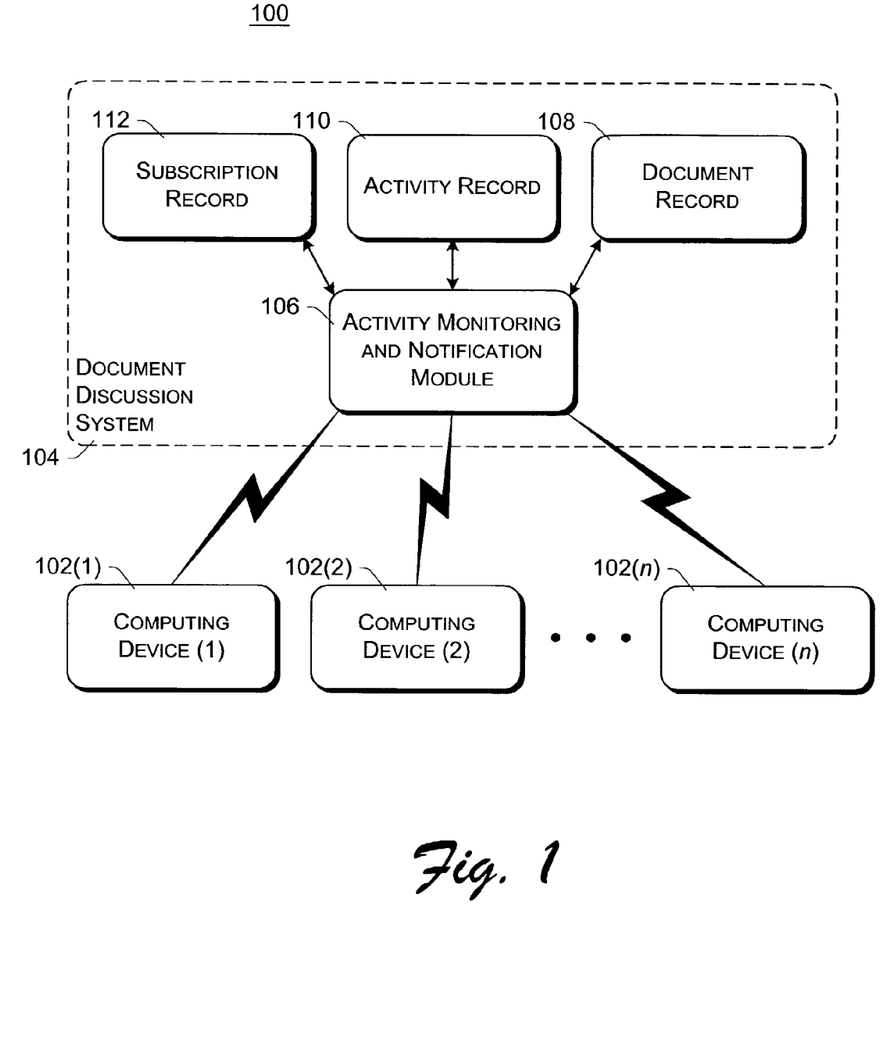
FIG. 1 is a block diagram illustrating an exemplary environment in which the notification of activity around documents may be used.

FIG. 1 is a block diagram illustrating an exemplary environment 100 in which the notification of activity around documents may be used. Multiple computing devices 102(1), 102(2), . . . , 102(n) are coupled to a document discussion system 104. The coupling between devices 102 and system 104 can be any of a variety of couplings allowing communication between system 104 and each of devices 102. In one implementation, the couplings include the Internet, and may also optionally include one or more other networks (e.g., a local area network (LAN) or wide area network (WAN)). The coupling may be based on any of a variety of network types and/or technologies, including wire and/or wireless networks. Additionally, communications between devices 102 and system 104 can be through any of a variety of network communications protocols, including public and/or proprietary protocols.

Computing devices 102 can be any of a variety of devices, including desktop PCs, workstations, notebook or laptop computers, handheld or portable PCs, personal digital assistants (PDAs), cellular phones, Internet appliances, gaming consoles, and so forth. Multiple different types of computing devices 102 can be communicating with document discussion system 104 concurrently.

Document discussion system 104 includes an activity monitoring and notification module 106, a document record 108, an activity record 110, and a subscription record 112. Document discussion system 104 manages documents that can be viewed, changed, and/or annotated by users of computing devices 102. The documents themselves may be stored as part of system 104, or alternatively documents may be stored on other devices external to system 104 and references to the documents stored in system 104. Although illustrated as a single module, activity monitoring and notification module 106 may alternatively be separated into multiple components and/or modules. Additionally, module 106 and records 108, 110, and 112 may be maintained by the same device, or alternatively may be separated over two or more devices.

A document refers to any type of digital content, such as text, graphics, images, video, audio, and so forth. A document may also be a combination of multiple types of digital content, such as articles, papers, or other publications including both text content and image content. A document can optionally be separated into multiple pieces or portions (e.g., different images can be different portions, different paragraphs can be different portions, sections with different headings can be different portions, etc.) Activity around the document refers to changes to the document (e.g., adding content, deleting content, moving sections, changing fonts, etc.) as well as annotations made to the document. Activity around the document may also refer to other actions, such as viewing or playing back the content, moving the content, copying the content, and so forth.

An annotation made on a document annotates the document and/or another annotation. An annotation that annotates another annotation is also referred to as a "reply" to that other annotation. An annotation that is replied to (whether it annotates the document or another annotation) is also referred to as a "base" annotation. Thus, an annotation can be both a base annotation and a reply annotation.

Annotations can be stored with the document they annotate, or alternatively can be stored separately. The content of the annotation can be anything the user creating the annotation (the annotator) desires. For example, the content of the annotation may be a question about the document, a note or point for the document author or annotator to follow up on, a highlighting of a portion of the document, a note for additional data to be added to the document, a note for a change to be made to the document, and so forth. An annotation can refer to a particular portion of the document (e.g., a certain sentence, paragraph, word, etc.) or can refer to the entire document. An annotation may be the same type of digital content as the document, or alternatively a different type.

Document record 108 is a record of documents managed by document discussion system 104. Document record 108 can be maintained using a table or alternatively other data structures. A document managed by document discussion system 104 can be viewed, changed, and/or annotated by a user of any of computing devices 102. Document discussion system 104 may optionally impose security restrictions on access to documents managed by system 104, such as restricting access to only particular users (e.g., based on a user id and password), particular computing devices (e.g., based on computing device identifiers), and so forth. The manner in which document record 108 is maintained can vary. In one implementation, document discussion system 104 is based on the Microsoft® Office Web Discussions features, and document record 108 is maintained in accordance with Microsoft® Office Web Discussions. Additional information regarding the Microsoft® Office Web Discussions features is available from Microsoft® Corporation of Redmond, Wash.

Activity record 110 is a record of activity that has occurred around the document(s) managed by document discussion system 104. Activity record 110 can be maintained using a table or alternatively other data structures. Module 106 monitors the activity around the documents managed by document discussion system 104, and any such activity is logged in activity record 110. For example, any changes made to a document managed by document discussion system 104 are recorded in activity record 110 (e.g., the actual changes made may be recorded, statistics regarding the changes (e.g., how many words were deleted, how many were added, etc.) may be recorded, etc.). By way of another example, any annotations made to a document are recorded in activity record 110. Activity record 110 also maintains a record of information about the activity, such as the author of the activity (e.g., a user identifier of the user that made an annotation or added content), the date and time of the activity, a subject line for the activity if any (e.g., typically entered by the author of an annotation), whether an annotation is a reply to another annotation, and so forth.

Activity monitoring and notification module 106 records activity around document(s) managed by system 104 in activity record 110. Information describing activity around a document (e.g., changes to a document and/or annotations to a document) is stored in activity record 110 along with an indication (e.g., time and date) of when the activity occurred. Activity record 110 can thus be subsequently queried and any activity around a document since the user last accessed the document readily determined (e.g., any activity with a time and date after the time and date the user last accessed the document). The actual activity (e.g., the actual changes to a document) may be stored in activity record 110 or alternatively a metric of the changes (e.g., an indication that "a lot has changed" or "a little has changed") may be stored.

Activity monitoring and notification module 106 can detect activity around a document in a variety of different manners. In one implementation, all activity passes through module 106 (e.g., the commands to add text to a document, delete a portion of a document, add an annotation, etc.), allowing module 106 to observe this activity and store it to activity record 110. In another implementation, module 106 is given (or otherwise has access to) both a current version of a document and the newly modified version. Module 106 compares the two versions to detect any changes and records those changes (or a metric of the changes) in activity record 110. In yet another implementation, when activity around a document occurs, the user supplies an indication to module 106 of the amount of activity (e.g., when the user is adding and deleting text, the user can state (e.g., by selection of a particular button or menu option) whether the changes are a "small change", "medium change", or "big change").

Subscription record 112 is a record of user subscriptions to document activity. A user of a computing device 102 can register with document discussion system 104 and request that the user be notified of activity around particular document(s) managed by system 104 in accordance with notification parameters selected by the user. These notification parameters are then stored in subscription record 112. The user is thus viewed as subscribing-to particular document(s) (or subscribing-to notifications regarding particular document(s)) managed by document discussion system 104. Multiple subscriptions to multiple documents by multiple users can be maintained concurrently using subscription record 112.

Figure 2:
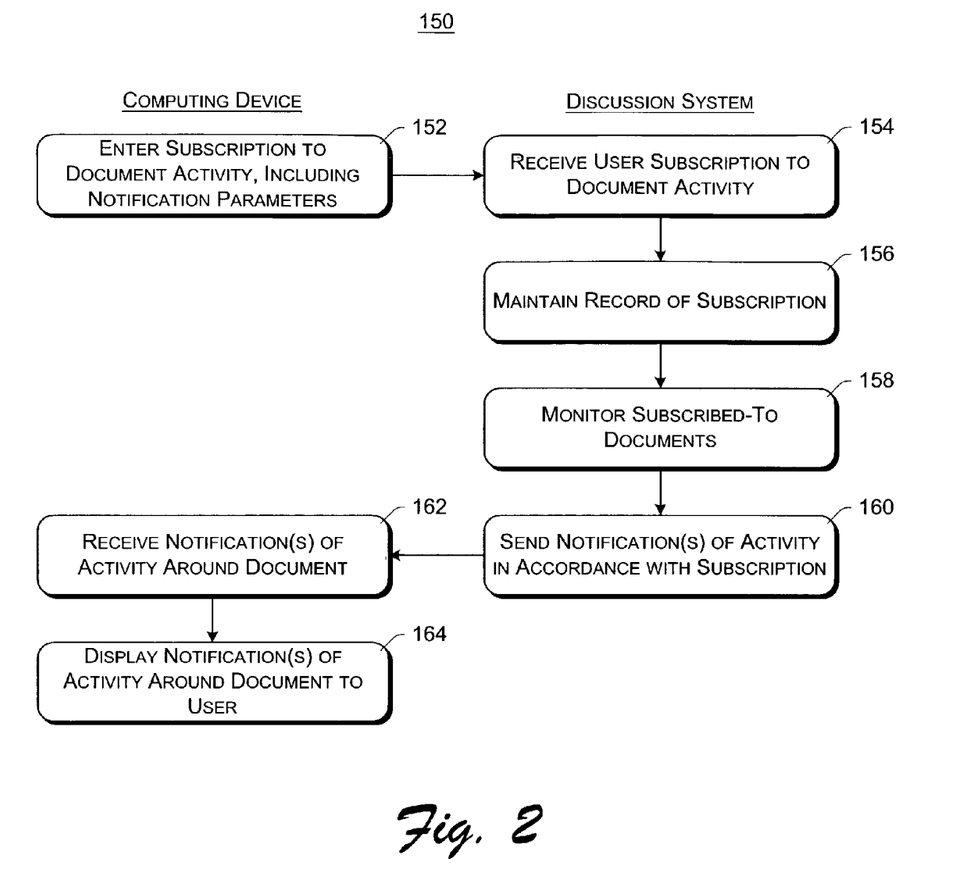
FIG. 2 is a flowchart illustrating an exemplary process for notifying users of activity around documents.

FIG. 2 is a flowchart illustrating an exemplary process 150 for notifying users of activity around documents. Process 150 may be performed in software, firmware, hardware, or combinations thereof. Process 150 is performed by a computing device (e.g., a device 102 of FIG. 1) and a discussion system (e.g., system 104 of FIG. 1). For ease of explanation, acts performed by the computing device are illustrated on the left side of FIG. 2, while acts performed by the discussion system are illustrated on the right side of FIG. 2.

Initially, a user enters a subscription to document activity (act 152). This user subscription includes one or more notification parameters selected by the user. The user subscription is received at the discussion system (act 154), which maintains a record of the subscription (act 156). The discussion system monitors the subscribed-to documents (act 158) for activity, and sends notification(s) of the activity to the user's computing device in accordance with the user's subscription (act 160). Where the notifications are sent (e.g., an electronic mail address, a computing device name or other identifier, etc.) can be selected by the user as a notification parameter.

The computing device receives the notification(s) of activity around the document (act 162) and displays the notification(s) of activity around the document to the user (act 164).

Returning to FIG. 1, users of computing devices 102 can generate documents for management by document discussion system 104, and can also view, change, and annotate documents managed by document discussion system 104. A user that subscribes to a document can be the document author or alternatively another individual(s) interested in the document (e.g., the author's supervisor or co-worker). A user can receive notifications on any computing device 102, and need not use the same computing device 102 as was used to generate the document.

A variety of different notification parameters can be selected by the user when subscribing to a document. A single parameter or multiple parameters can be selected, and these can be changed by the user after subscribing. Numerous notification parameters are discussed herein. It is to be appreciated that a particular document discussion system may support all of these notification parameters, or alternatively a subset of one or more of the parameters. The discussions herein refer to users subscribing to documents, and allowing the notification parameters for different documents to be different. Alternatively, subscriptions may be per-user, with the notification parameters being the same for all documents subscribed-to by the user.

Notification parameters can be selected in a variety of different manners. In one implementation, a selection window or box is presented to the user allowing him or her to enter his or her selections via radio buttons, check boxes, text entry fields, drop down menus, combinations thereof, etc. This selection window or box may be presented, for example, as a HyperText Markup Language (HTML) document via a conventional browser application, or an interactive ASP (Active Server Page) web page displayed via a conventional browser application. Such an HTML document or ASP document can be hosted by the document discussion system 104 copied to the client device 102 as appropriate for entry of the user selections. Alternatively, the user may make his or her selections from an application installed on a computing device 102 (e.g., using drop-down menus from a menu bar, inputs to text entry fields, etc.).

One notification parameter that can be selected by the user is electronic mail (email) notification and/or peripheral awareness notification (the user can select either type of notification or both types of notification). Electronic mail notification refers to notification by electronic mail. Document discussion system 104 generates an electronic mail message (or alternatively forwards data to be included in an electronic mail message to another device which in turn generates the message) and sends the message (or has the message sent) to the user. The message sent to the user includes information about the activity, and optionally may include the content of annotations made to the document(s).

Peripheral awareness notification refers to notification via a peripheral awareness mechanism on the computing device 102 being used by the user. The peripheral awareness mechanism is at least a portion of a display of the computing device 102 on which a persistent window is maintained. Within this persistent window is included one or more annotation tickets, each of which is a typically small (relative to the size of the entire display) indication of information regarding the annotations of a particular document(s) (or portion(s) of a document(s)). Peripheral awareness and annotation tickets are discussed in more detail below.

Figure 3:
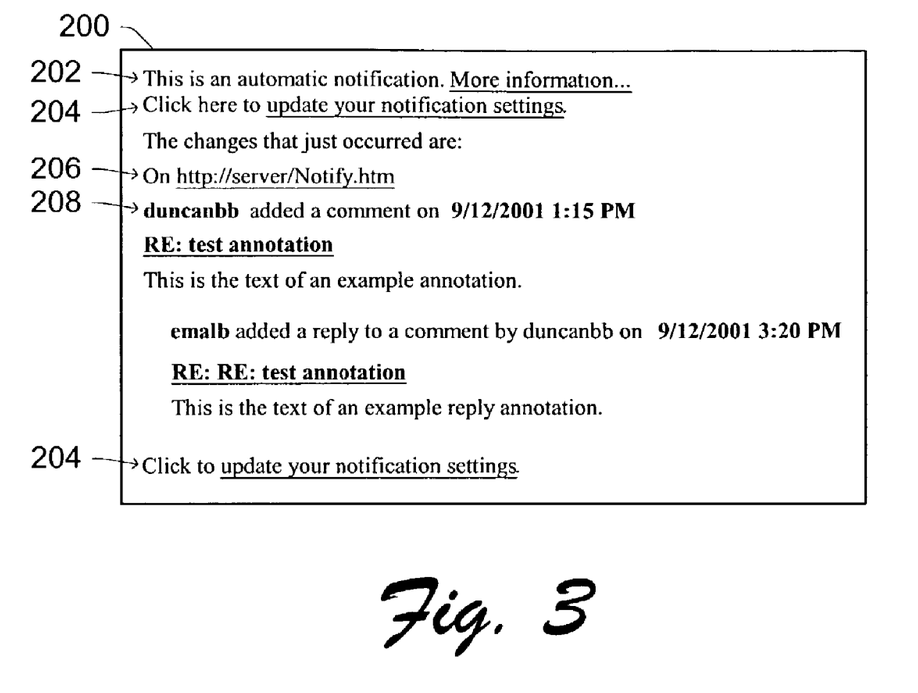
FIG. 3 illustrates exemplary content that can be included in an electronic mail message notifying a user of activity that has occurred around a document.

When a user subscribes to a document and selects electronic mail notification, the user receives electronic mail messages including information identifying the activity that has occurred around the document. The electronic mail messages are sent to the user at an electronic mail address(es) specified by the user when subscribing to the document. FIG. 3 illustrates exemplary content that can be included in an electronic mail message notifying a user of activity that has occurred around a document.

An exemplary message 200 received by a user of a computing device 102 of FIG. 1 is illustrated in FIG. 3. Additional header information (not shown in 11 FIG. 3), such as the sender and recipient electronic mail addresses, the date and time the message was sent, etc. may also be displayed as part of message 200. This additional header information has not been included in FIG. 3 so as to avoid cluttering the drawings. Message 200 includes an identification portion 202 that identifies message 200 as an automatically generated (e.g., by document discussion system 104 of FIG. 1) notification message and allows the user to obtain additional information about the document discussion system by selecting the "More information . . . " link. Selection of the "More information . . . " link causes a viewer, such as a conventional web browser, to be loaded and executed on the user's computing device (if not already executing) and the additional information regarding the document discussion system displayed to the user via the browser.

Two update portions 204 are included in message 200 that allow the user to modify his or her notification settings (e.g., the notification parameters he or she has selected). A source portion 206 identifies the document that the activity is around, and includes a link to the document. Selection of the link in source portion 206 causes the document to be retrieved and displayed to the user on the computing device (e.g., via a conventional web browser). Source portion 206 is optionally tied to the specific location in the document that the annotation is associated with (that is, the portion of the document being annotated by the annotation), and selection of the link causes the document to be scrolled to the location that the annotation is associated with. Thus, by selecting the link in source portion 206, the user can readily view the portion of the document that the annotation corresponds to.

Annotation portion 208 identifies the user identifier ("emalb" in this example) of the author of the annotation that the user is being notified of, the date and time of the annotation, and also an indication of whether the annotation is in reply to another annotation (in this example, the annotation is in reply to an annotation previously made by the user with user identifier "duncanbb"). Annotation portion 208 also includes the content of the annotation (which is text in message 200). Annotation portion 208 also includes the content of the base annotation that the reply annotation is in reply to. The reply annotation is offset (e.g., indented) in order to differentiate the reply from the base annotation.

Message 200 of FIG. 3 is exemplary only. Various modifications may be made to message 200, and electronic mail message notifications may not include all of the information illustrated in message 200. For example, notification of a change to a document would not include the annotation information illustrated in FIG. 3.

Returning to FIG. 1, a user may select, as notification parameters, particular times that the user desires to receive electronic mail notifications. The particular time can include how frequently the user desires to receive electronic mail notifications, such as immediate (e.g., as soon as the activity occurs), hourly, daily, twice weekly, weekly, etc. The electronic mail notification sent includes all of the activity that has occurred around the document since the last notification was sent to the user. The user can also specify a particular time when notifications should be sent (e.g., 9:00. am, 5:00. pm, etc.), as well as a particular date to use as a basis for the frequency of the notifications (e.g., every other day starting on June 21).

A user can also select a plurality of conditions for sending electronic mail notifications, the occurrence of any one of which results in sending of an electronic mail message notification to the user. For example, the user may specify that he or she would like to receive notifications weekly or if the activity on a document since the last notification exceeds a threshold amount. The activity on the document can be measured in a variety of different ways, such as a number of new annotations on the document, a number of new reply annotations on the document, a number of new users annotating the document, a number of different users annotating the content, combinations thereof, etc. The threshold value(s) may be static (e.g., two new users annotating the document, five different users annotating the document, etc.) or dynamic (e.g., relative to a normal amount of activity around the document, such as 10% more different users than were annotating the document during the preceding two weeks, 25% more annotations than were entered during the intervals between the three preceding notifications, etc.).

A user can also select notification parameters to cause activity monitoring and notification module 106 to batch together the annotation information for multiple different documents into a single electronic mail notification. The user can specify a notification parameter to group together multiple documents. When module 106 determines it is time to send an electronic mail notification to the user (based on the user's selected time and/or frequency, discussed above), module 106 identifies all the new activity around the documents in the group and combines the information for the new activity into a single electronic mail message. The single electronic mail message can be formatted in different ways, such as a header identifying each document and then the annotation for each document below that header. By grouping the activity information for a group of documents into a single electronic mail message, the number of electronic mail notifications sent to the user can be reduced.

Figure 4:
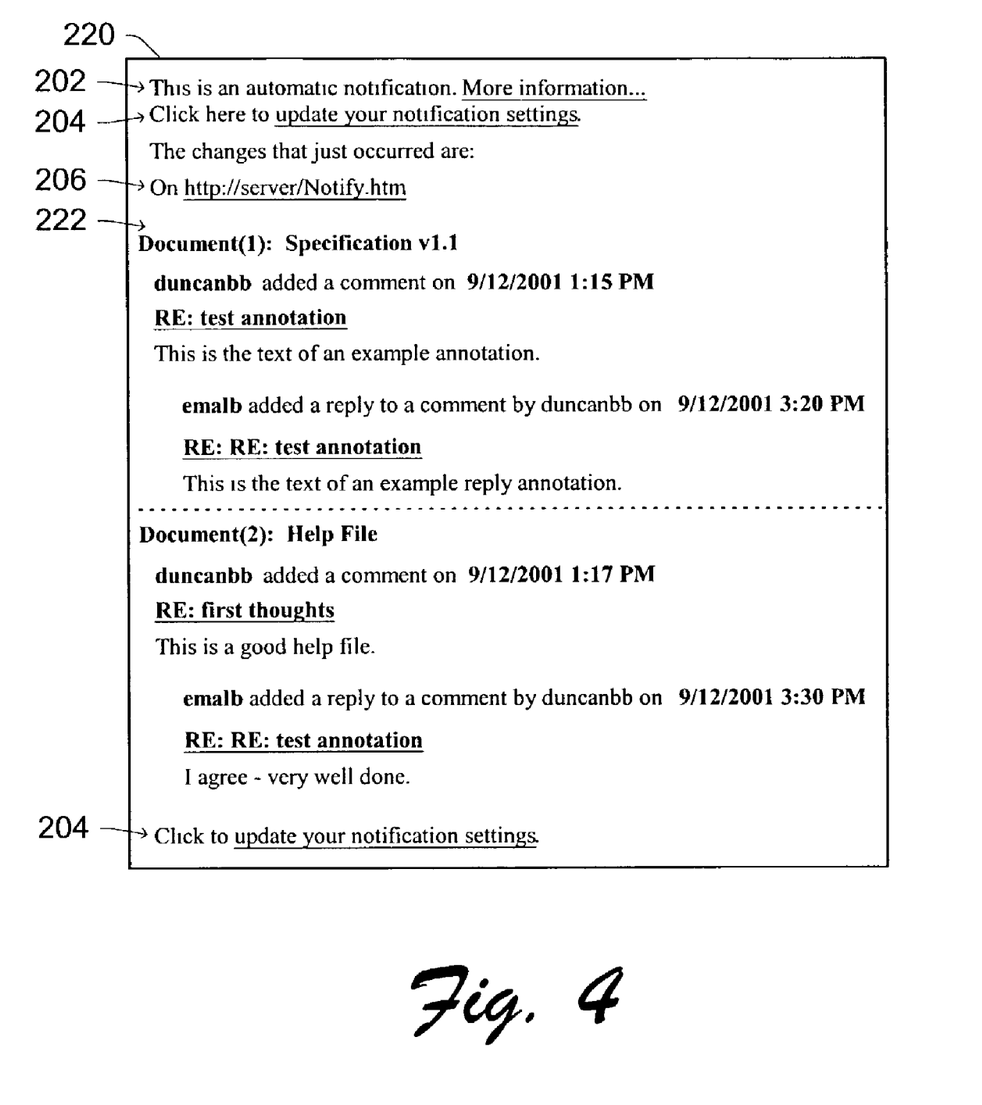
FIG. 4 illustrates an example message grouping the activity information for a group of documents into a single electronic mail message.

FIG. 4 illustrates an example message 220 grouping the activity information for a group of documents into a single electronic mail message. Message 220 is similar to message 200 of FIG. 3, including an identification portion 202, update portions 204, and a source portion 206. Annotation portion 222 includes annotation information for multiple documents, and for each of the multiple documents, includes the user identifier of each annotation that the user is being notified of, the date and time of the annotation, an indication of whether the annotation is in reply to another annotation, and the annotation content.

An abstract summarizing the annotations made to a document may also be generated and included in the electronic mail notifications. The summary may be used with a group of one document or a group of multiple documents. The summary includes information summarizing the activity that has taken place with regard to the document(s) in the group. The summary can include, for example, an indication of how many total annotations have been made on each document in the group, an indication of how many new annotations have been made on each document in the group since the last electronic mail notification was sent, an indication of how many total base annotations have been made on each document in the group, an indication of how many new base annotations have been made on each document in the group since the last electronic mail notification was sent, an indication of how many total reply annotations have been made on each document in the group, an indication of how many new reply annotations have been made on each document in the group since the last electronic mail notification was sent, an indication of how many different users have made annotations on the document, an indication of how many different users have made changes to the document, an indication of when the last annotation or change was made to the document, and so forth.

A user can also select notification parameters to cause activity monitoring and notification module 106 to send a notification to the user whenever another user enters a reply to an annotation made by the user. This selection may be for immediate notification (as soon as the activity is detected), or alternatively may be for some other interval (e.g., hourly, daily, weekly, etc. analogous to the discussion above). The user may also specify particular other users that he or she does (or does not) want to receive notifications in the event the user replies to one of his or her annotations. For example, the user may specify that if user A replies then send a notification immediately, if user B replies then ignore it (send no notification of it, optionally unless some other user also replies), and send notification of any other users' replies daily.

A user can also select notification parameters to cause activity monitoring and notification module 106 to send a notification to the user regarding changes to the document. This notification can be included with notifications of annotations, or alternatively can be a separate notification. This notification can also include the time and/or date when the most recent change was made to the document. In one implementation, a general indication is given as to the amount of change (e.g., no changes, minor changes, or significant changes). The general indication can be determined in a variety of manners, such as: based on a number of edits performed (e.g., additions and deletions of text); based on an amount of content added and/or deleted; based on an indication, supplied by the user making the changes, of the amount of changes (e.g., a comment supplied by the user, a selection of one of "small", "medium" or "large" options, etc.); and so forth. The determination can be static (e.g., if changes are made and if fewer than five edits are performed or fewer than ten words are added and/or deleted then the changes are minor, and if five or more edits are performed or ten or more words are added and/or deleted then the changes are significant). The determination can alternatively be dynamic (e.g., if changes are made but fewer than 3% of the words are changed then the changes are minor, if 3% or more of the words are changed then the changes are significant).

A more specific indication may also be given, in addition to or in place of the general indication. Such a specific indication may include, for example, how many words were added or deleted, how many edits were performed, how much time users spent time changing the document, how many different users changed the document, whether any changes were flagged as important, etc.

Peripheral awareness notifications may also be selected by the user, in addition to or in place of electronic mail notifications. A peripheral awareness notification causes an annotation ticket to be displayed on the computing device being used by the user. Notification of activity is sent from the document discussion system 104 to the computing device, which displays the appropriate information in the annotation ticket. The information displayed in the annotation ticket typically includes an identification of the document and an indication of activity around the document (such as a total number of annotations made on the document and a number of new annotations made on the document). An annotation ticket may also differentiate between base annotations and reply annotations, thus including an identification of the document, a total number of base annotations made on the document, a number of new base annotations made on the document, a total number of reply annotations made on the document, and a number of new reply annotations made on the document.

A new annotation is an annotation that has been made since some particular reference point (e.g., an event or a time). The definition of a new annotation on the document can be user-specified (e.g., as a notification parameter). A new annotation may be, for example: an annotation entered since midnight, an annotation entered since 9:00. pm last night, an annotation entered during the preceding 24. hours, an annotation entered during the, preceding week, an annotation entered yesterday or today, an annotation entered since a particular date (e.g., since Apr. 15, 2002), an annotation entered since the document was created, an annotation entered since the user last opened the document, an annotation entered since the document was last modified, an annotation entered since last Monday, an annotation entered since the last fiscal quarter, and so forth.

In one implementation, a peripheral awareness counter is included on client device 102 that maintains a record of the new annotations for displaying of the appropriate number in the annotation ticket. This peripheral awareness counter is reset each time the document is opened (this may be sensed by the counter on device 102, the server storing the document may notify the counter on device 102, or the document discussion system 104 of FIG. 1 may notify the counter on device 102). In one implementation, the document viewer (e.g., Microsoft® Word, Microsoft® Internet Explorer, etc.) sends a notification (e.g., a message or command) to the counter that identifies when a particular document is opened. This counter can then be used as a basis for defining a new annotation (e.g., if the definition is any annotation entered since the user last opened the document).

Figure 5:
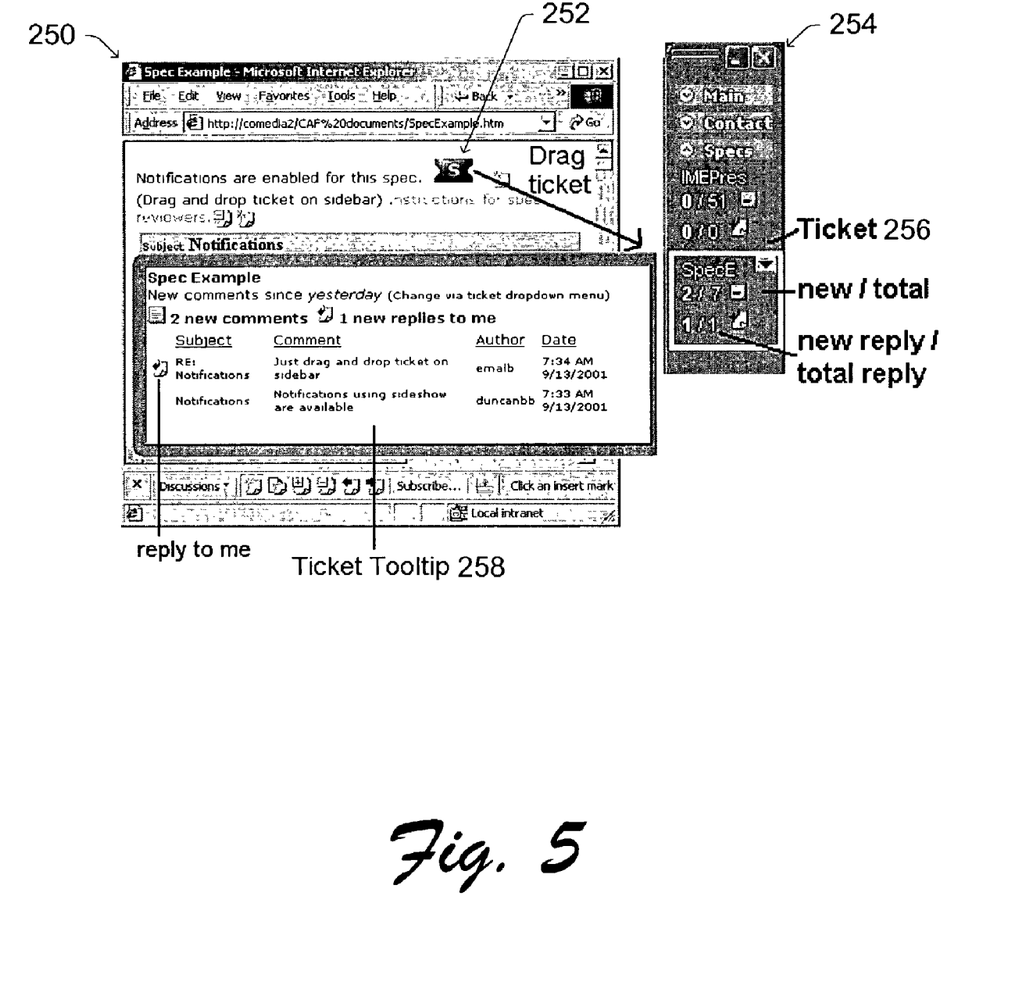
FIG. 5 illustrates an exemplary annotation ticket for a document.

FIG. 5 illustrates an exemplary annotation ticket for a document. A document 250 being displayed on a display of a computing device (e.g., a device 102 of FIG. 1) has a ticket icon 252. The document can be displayed, for example, in a conventional web browser window. The user can drag the ticket icon 252 to a persistent window 254 being displayed on the display of the computing device, causing the device to add an associated annotation ticket 256 to persistent window 254. Annotation ticket 256 identifies the document (SpecE) and also indicates activity around the document: the total number of base annotations (7), the number of new base annotations (2), the total number of reply annotations (1), and the number of new reply annotations (1).

A ticket tooltip window 258 is also shown in FIG. 5. Ticket tooltip window 258 is opened when a pointer is dragged over annotation ticket 256. Ticket tooltip window 258 includes additional information regarding the annotations made on the document. For example, as illustrated in FIG. 5, the tooltip window 258 identifies the subject line, annotation content, author, and date of the new annotations.

A variety of different information can be included in tooltip window 258. In one implementation, any of the information discussed above with reference to electronic mail message notifications can be included in the tooltip window, including links to the document being annotated, links to allow notification parameters to be set, offsetting replies to indicate which base annotations they are in reply to, etc.

In one implementation, each annotation ticket corresponds to a single document. Alternatively, multiple documents may be referenced in a single annotation ticket. The multiple documents and their activity may be identified separately (e.g., an indication of total annotations and new annotations for each document) or alternatively combined (e.g., an indication of total annotations and new annotations for all the documents combined). Multiple documents can be selected in a variety of different manners. For example, a notification parameter selection window may be displayed to the user where he or she can enter document names or drag and drop ticket icons. By way of another example, a user may, drag and drop a ticket icon on an annotation ticket being displayed in persistent window 252 to cause the document corresponding to the ticket icon to be grouped together with the document(s) already corresponding to the annotation ticket.

In another alternative, a document may be separated into multiple portions (e.g., paragraphs, sections with different headers, pages, chapters, etc.). Each of these multiple portions can be identified in the annotation ticket rather than the entire document. A particular portion can be selected in a variety of different manners, such as entry of portion names in a notification parameter selection window. By way of another example, each portion may have its own ticket icon that can be dragged and dropped to cause an annotation ticket for the corresponding section to be added to the persistent window.

Various other notification parameters may also be set by the user and apply for both electronic mail message notifications and peripheral awareness notifications. Activity monitoring and notification module 106 can have a set of pre-defined roles from which the user can choose. These roles can be pre-defined by the designer of module 106, by a system administrator of document discussion system 104, etc. Each of these roles has a set of one or more notification parameters associated with the role. When the user selects a particular role for a x document, he or she is selecting all of the notification parameters associated with that role. Optionally, the user may be allowed to subsequently modify those notification parameters on a per-document basis. For example, a "manager" role may be defined with notification parameters indicating peripheral awareness notifications and weekly electronic mail message notifications with abstracts. By way of another example, an "author" role may be defined with immediate electronic mail message notifications.

In one implementation, a user is also able to define his or her own sets of pre-defined notification parameters and assign those sets a name or identifier. These user-defined sets can be viewed as user-defined roles, and selected by the user in the same manner as other roles.

In another implementation, a user is able to copy the notification parameters from one document to another. When subscribing to a particular document, the user identifies another document (e.g., by name, by link, by dragging and dropping an icon representing the file, etc.) that is to be used as a basis for the subscription to the particular document. Activity monitoring and notification module 106 copies the notification parameters from the other document for use with the particular document.

Figure 6:
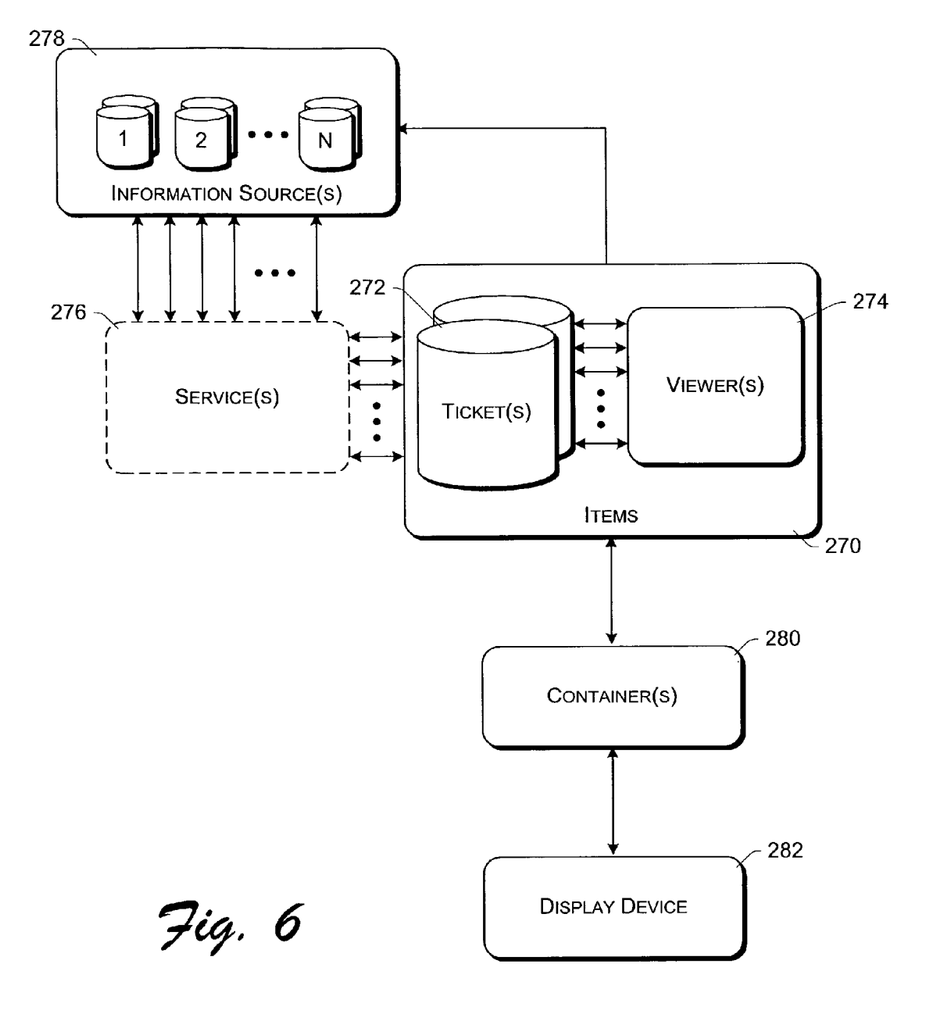
FIG. 6 illustrates an exemplary architectural diagram which illustrates basic components for implementing a peripheral awareness interface system.

FIG. 6 illustrates an exemplary architectural diagram which illustrates basic components for implementing a peripheral awareness interface system. Peripheral awareness systems are discussed in additional detail in U.S. patent application Ser. No. 10/063,296, entitled "A System and Process for Providing Dynamic Communication Access and Information Awareness in an Interactive Peripheral Display", which was filed Jun. 8, 2001, in the names of Anoop Gupta, Gavin Jancke, Gina Venolia, and Jonathan Cadiz, and which is hereby incorporated by reference.

It should be noted that the boxes and interconnections between boxes that are represented by broken or dashed lines in FIG. 6 represent alternate embodiments, and that any or all of these alternate embodiments may be used in combination. In general, specifying, tracking or receiving, and providing the status of information of interest, such as activity around a document as described above, can be accomplished through the use of at least one customizable dynamic encapsulated object referred to as a ticket 272 that when paired with a viewer 274, provides peripheral awareness of information of interest to a user via a container 280 for implementing the peripheral awareness interface on any conventional display device 282.

A system and process includes four basic components: 1) One or more tickets 272 which describe what is to be tracked or watched, where and how the data or contact information can be found, and what type of viewer 274 is appropriate for viewing whatever is to be tracked or watched; 2) Zero or more services 276 representing the means, i.e., where and how, by which information or contacts are tracked or otherwise watched; 3) One or more viewers 274 from a predefined or user definable or editable library of viewers, each viewer having the capability to display particular tickets 272 within a container 280; and 4) one or more containers 280 for hosting ticket/viewer pairs, i.e., "items" 270, the containers representing peripheral awareness interfaces residing on one or more display devices 282.

In particular, as illustrated by FIG. 6, "items" 270 comprising pairs of "tickets" 272 and "viewers" 274 optionally make use one or more "services" 276 to dynamically track, interact with, and/or watch one or more particular information sources 278. It should be noted that as described below the viewers 274 comprising a portion of the items 270 may contain ActiveX® or other types of controls that directly make HTTP or other communication calls without the need for using services 276. Consequently, the items 270 optionally use one or more "services" 276. By dynamically tracking or watching particular sources of information 278, a current status of any particular information or communications contact is provided to the user. This information is provided graphically, textually, or via some combination thereof, by hosting one or items 270 within one or more containers 280 for providing peripheral awareness interfaces on one or more display devices 260.

In general, a ticket 272 is a combination of the information that a user desires to keep track of along with a definition of how the user desires to view that particular information or contact. The term "ticket" 272 describes an extensible markup language (XML) structure, or similar language structure that defines the content of an item 270 within the container 280, such as a "sidebar". In particular, a ticket 272 consists of two portions: one that is common to all types of items, including, for example, a control name, CLSID of an ActiveX® (or other scripting language) control associated with the ticket, a URL or file path for where to obtain the code or script control if it is not locally installed, etc.; and one that varies based on the type of the ticket, including parameters specific to that ticket type, such as, for example, what type of viewer 274 is required to display the information defined by the ticket. While tickets 272 can use ActiveX® controls, it should be appreciated that many other scripting languages may be used to create controls or instructions in place of ActiveX® controls.

In particular, tickets 272 can be described as the individual controls hosted with a viewer 274 in the container or sidebar 280. These tickets 272 can be created using any one of a number of conventional programming or scripting languages, including, for example, ActiveX®, C++, Visual Basic, and DHTML plus JavaScript. However, as described below with respect to containers 280, regardless of which language is used to create the tickets 272, the tickets preferably support specific interfaces or specifications required by the container so that the container can successfully manage the items 270 comprised of the ticket/viewer pairs. Exemplary ticket 272 types include, for example, annotation tickets.

Ticket 272 can include instructions for using conventional electronic communications methods for dynamically collecting statistical information relative to a document as it becomes available. Further, the ticket 272 also includes instructions for how to display particular information, as well as what type of viewer 274 is to be used for displaying that information within the container 280. One example of such instructions includes instructions to change the color of the displayed information when greater than a particular number of new annotations have been added to the document. Additionally, such display instructions can be user configurable (e.g., set as notification parameters) so that a user can display the desired information in a format of the user's choice.

Another useful feature of tickets 272 is that, in certain embodiments, tickets are shareable between users. Consequently, tickets 272 may be shared via email, or via any other means for transferring electronic files. For example, tickets 272 may be copied, cut, pasted, stored, saved, transferred, transmitted, etc., like any other electronic file using conventional techniques. In a related embodiment, tickets 272 can be posted on web sites then copied and pasted or dragged and dropped to the container 280, or to any other location on the display device 282.

Further, also as described in further detail below, tickets 272 can be stored in user profiles or databases or any other computer readable media to be accessed via any of the user's Internet or network enabled devices, or shared by colleagues, customers, friends and family, etc. of the user by simply copying or manually or automatically transmitting the ticket or, tickets to whatever computing device a user wishes the ticket to be hosted on. In addition, users can manage the tickets 272 such as by adding, editing, or deleting tickets via a user interface.

Services are automatically or manually selected from a predefined or user definable library of services. Zero or more "services" 276 are used for interacting with particular information of interest. Current information or status is automatically either retrieved or received, i.e., either by "pulling" or "pushing" such information, from any one or more of a number of conventional communications sources 278 by using the functionality associated with one or more services 276. By way of example, such information sources include local file servers, email servers, MAPI servers, file transfer services, electronic databases, electronic files, instant messaging or other peer-to-peer communications schemes, or any other possible source of electronic data. However, as noted above, services 276 are not limited to merely providing communications to one or more sources of information.

In particular, the different services 276 represent shared code or functions that provide functionality for accessing, receiving, retrieving, and/or otherwise interacting with any conventional information, source of information, or communications contact. These services 276 are shared in the sense that they are used either alone, or in combination, and may be used simultaneously by one or more tickets. Consequently, it should be noted that in certain embodiments multiple services 276 are used in combination for providing complex interactions with any conventional information, source of information, or communications contact.

One example of a "service" 276 is, the functionality necessary for monitoring an email folder by connecting to a conventional MAPI server. Another example of a service 276 is functionality for sending or receiving email messages. Related services 276 provide functionality for communicating with contacts or transferring information via any number of conventional methods, such as, for example instant messaging or peer-to-peer communications schemes. Another example of a service 276 is functionality to convert a text file from one language to another. A further example of a service 276 is functionality necessary for monitoring a database. Still other examples of services 276 include functionality for receiving or retrieving data from a web site or a remote server. Any conventional method for interacting with information or source of information can be implemented as a shared service 276 for use by one or more tickets 272.

Each ticket 272 independently specifies which services 276, if any, i.e., which particular methods, protocols, communications channels or devices, are to be used for connecting with, and/or interacting with, the information source or sources 278. The services 276 can be any conventional method or protocol for completing communications between two or more electronic devices.

Each of the tickets 272 is paired with a "viewer" 274. These viewers 274 graphically and/or textually display the ticket 272 within the container 280 as a resizable thumbnail or icon-sized window that includes the information retrieved in accordance with the aforementioned ticket instructions. In particular, the viewer 274 is capable of dynamically displaying a ticket 272 having textual, audible, or graphical information, including still or live images, or any combination of textual, audible, or graphical information.

Each ticket 272 includes instructions as to which viewer is to be used for displaying the information represented by the ticket. For example, one viewer type is capable of displaying annotation information. In one embodiment, the viewer 274 is one of a set or library of specialized viewers that are each designed to display particular types of data, contacts, or information. However, in another embodiment, the viewer 274 is implemented as a "multi-viewer" which is in essence an aggregation of individual viewers. These "multi-viewers" are useful for displaying information relating to an aggregation or grouping of tickets 272 in a single thumbnail type view within the container 280.

The viewer 274 typically includes the following functions: first, the viewer shows the most relevant states of the contact or information being observed in accordance with the ticket 272 instructions (e.g., the most current information, and/or the most important parts of the information that can be displayed within the ticket thumbnail); and second the viewer automatically displays the information within the thumbnail in such a way as to make good use of the space allotted to the thumbnail. Further, as noted below, the container 280, and the thumbnail contained therein is resizable in one embodiment. Consequently, in one embodiment, as the thumbnail is resized, the viewer automatically detects the size or available area of the thumbnail and dynamically provides whatever information can fit into the thumbnail on a priority basis, i.e., the most important parts of the information are displayed first, with less important information being displayed as space permits.

Further, in the spirit of providing peripheral awareness as described herein, one embodiment of the viewer 274 is capable of automatically changing the appearance of graphically displayed tickets 272 over time in order to unobtrusively alert a user as to changing information or communications state or status. For example, in one embodiment, where a ticket 272 has new or current information, retrieved from one or more information sources 278 via one or more services 276, that new or current information can be represented in color, or in gray scale, by using high contrast or brightness levels, or by using any conventional type or style of shading or transparency. However, as time passes, and the information becomes less current, the graphically represented ticket 272 may slowly fade to gray scale, or alternately, the contrast or brightness levels may slowly fade to indicate aging of the information. In other embodiments, the viewer 274 may also provide audible alerts, visible alerts, or any desired combination of audible and visible alerts. In related embodiments, the user may discontinue or otherwise edit or change individual alerts or types of alerts via the user interface described below.

Simply stated, the container 280 hosts peripheral-awareness items 270, i.e., ticket/viewer pairs (272/274). The container 280 is implemented in one embodiment as a persistent "sidebar" for displaying items 270 along either a portion of the display device 282, or the entire display device. This sidebar is persistent in the sense that it is always on top, while limiting the available display area on the display device 282 with respect to other open applications or windows such that it does not obscure portions of any other application windows. However, in other embodiments, the container 280 is not persistent, i.e., it can be covered by one or more application windows, nor does it limit the available display area. Further in another embodiment, a mixture of both persistent and non-persistent containers 280 may simultaneously reside on a given display 282. In still another embodiment, a conventional "auto-hide" function is associated with one or more containers 280, such that a particular container is not visible until a user moves a pointing device near one edge of a display device 282. In this embodiment, the container 280 is shown when the user moves the pointing device to an edge of the display 282 where the container resides. The container 280 is then automatically removed from the display when the user moves the mouse away from the container.

As described above, the items 270 represent ticket/viewer pairs (272/274). Consequently, the items 270 include ActiveX® or other scripting language controls which include the instructions as to what information or communications contact is to be tracked, acquired, etc., along with a specialized viewer 274 for displaying that information or communications contact in whatever manner is instructed by the ticket 272. In general, the container 280 specifies the screen area used for displaying items 270 on the display device 282, allows items 270 to be grouped, aggregated, and manipulated spatially via a user interface, as described below. Further, the container is capable of intercepting certain types of events, such as, for example, user interaction with the items, and of passing those events to the ticket 272 controls as appropriate.

There are many ways of implementing the container 280, such as by the use of various conventional scripting languages. For example, a container/sidebar can be implemented via a dynamic scalable window composed of DHTML and JScript with the assistance of a core ActiveX® control. Consequently, in one embodiment, the sidebar uses conventional web browser-based techniques to support dynamic object creation, hosting, and manipulation. This serves to eliminate the need for extensive and complex proprietary code development each time a third party desires to implement a ticket 272.

Further, in another embodiment, the container/sidebar 280 requires that the aforementioned container controls support predefined interfaces so that each container can manage the items 270 as required by predefined guidelines specified for a user interface. Implementing such guidelines serves to bring consistency to an end-user experience, while ensuring that all tickets 272 will work with any device capable of displaying such tickets when combined with the appropriate viewer 274. Consequently, support of such predefined interfaces serves to ensure compatibility with any third party tickets 272, regardless of the source of those tickets. In other words, the container 280 is designed in such a way as to support all tickets 272 provided to the container, from whatever source, so long as predefined guidelines are followed.

For example, one set of exemplary rules for implementing the tickets 272 is that: 1) the tickets should indicate how much display area or screen real estate they require; 2) the tickets should provide a configuration user interface; 3) the tickets should provide a pop-up window (tooltip window) for accessing detailed information; and 4) the tickets should also allow the container or sidebar 280 to pass them their context data, i.e. the information of interest.

Figure 7:
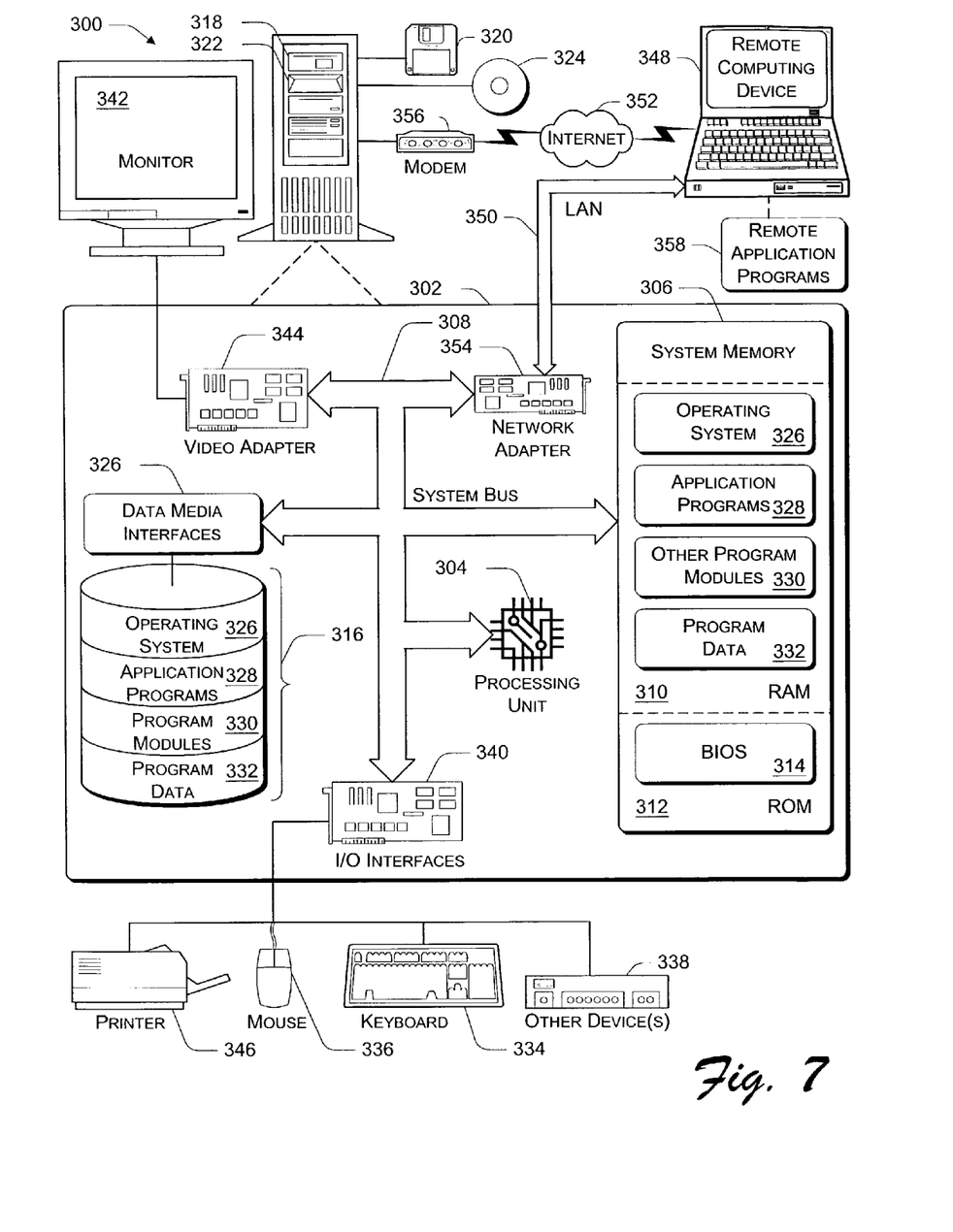
FIG. 7 illustrates a general computer environment which can be used to implement the notification of activity around documents described herein.

FIG. 7 illustrates a general computer environment 300, which can be used to implement the notification of activity around documents described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the exemplary computer environment 300.

Computer environment 300 includes a general-purpose computing device in the form of a computer 302. Computer 302 can be, for example, a computing device 102 of FIG. 1, or a device implementing one or more of activity monitoring and notification module 106, document record 108, activity record 110, and subscription record 112 of FIG. 1. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 7 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are exemplary and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method in a computing device for providing to user notifications of activity associated with documents of different types, comprising:
   providing access to information sources, each information source providing documents of different types;
   for each information source, providing a service having functionality for monitoring the documents of the document type of the information source;
   receiving a subscription request from a user, the subscription request identifying a selected plurality of documents of a selected information source and indicating a request to receive an automatically generated notification to inform the user of annotations that have been added for the selected plurality of documents of the selected information source by a selected time, the subscription request indicating to notify the user of annotations added for a document via an electronic mail message or a peripheral awareness notification;
   storing for the received subscription request a ticket that specifies the service of the selected information source, the selected documents, instructions for collecting annotations that have been added for a document, and an indication of how the user is to be notified;
   monitoring via the service for the selected information source each of the selected plurality of documents for annotations that have been added for the documents in accordance with the stored ticket;
   combining information regarding respective annotations that have been added for multiple documents among the selected plurality of documents by the selected time and generating a notification including the combined information;
   when the stored ticket indicates to notify the user via an electronic mail message, sending the generated notification via an electronic mail message to the user; and
   when the store ticket indicates to notify the user via a peripheral awareness notification, displaying to the user the notification.

2. A method as recited in claim 1, wherein the annotations for a first document of the plurality of documents includes a base annotation and a reply annotation in reply to the base annotation, and wherein the reply annotation is included in the electronic mail message as offset from the base annotation.

3. A method as recited in claim 1, wherein the electronic mail message further includes, for each of the annotations, a link to a location in the document to which the annotation has been made.

4. A method as recited in claim 1, wherein a user requests to receive annotation notifications for the plurality of selected documents immediately once an annotation has been added.

5. A method as recited in claim 1, wherein a user requests to receive annotation notifications for the plurality of selected documents daily.

6. A method as recited in claim 1, wherein the selected times comprise a user-configurable day, a user-configurable time, and a user-configurable interval.

7. A method as recited in claim 1, further comprising:
   receiving a user request to receive notification of one or more annotations added for the plurality of documents in response to one or more of a plurality of user-specified conditions being satisfied; and
   sending, in response to one or more of the plurality of user-specified conditions being satisfied, the electronic mail message to the user.

8. A method as recited in claim 1, further comprising:
including, in the electronic mail message, an indication of the changes to the one of the plurality of documents in the time since the user was last notified of changes to the one of the plurality of documents.

9. A method as recited in claim 1, further comprising:
generating an abstract that summarizes the annotations; and
including the abstract in the electronic mail message.

10. One or more computer readable media having stored thereon a plurality of instructions that, when executed by one or more processors, causes the one or more processors to:
receive a user request identifying a plurality of documents and indicating a request to send an electronic mail message to inform the user of one or more annotations to the plurality of documents in response to one or more of a plurality of user-specified conditions being satisfied, a user-specified condition indicating a threshold number of annotations being greater than one; and
send, in response to one or more of the plurality of user-specified conditions being satisfied including the number of annotations exceeding the threshold number of annotations, the electronic mail message to the user, wherein the electronic mail message includes the annotations and an indication of changes to the one of the plurality of documents in the time since the user was last notified of changes to the one of the plurality of documents.

11. One or more computer readable media as recited in claim 10, wherein a first of the plurality of user-specified conditions comprises a time interval elapsing, and wherein a second of the user-specified conditions comprises an amount of activity regarding the document exceeding a threshold.

12. One or more computer readable media as recited in claim 11, wherein the amount of activity exceeding the threshold comprises a number of different users annotating the document exceeding the threshold.

* * * * *